(12) United States Patent
Mallick et al.

(10) Patent No.: US 11,099,754 B1
(45) Date of Patent: Aug. 24, 2021

(54) STORAGE ARRAY WITH DYNAMIC CACHE MEMORY CONFIGURATION PROVISIONING BASED ON PREDICTION OF INPUT-OUTPUT OPERATIONS

(71) Applicant: EMC IP Holding Company LLC, Hopkinton, MA (US)

(72) Inventors: Sanjib Mallick, Bangalore (IN); John Krasner, Coventry, RI (US); Arieh Don, Newton, MA (US); Ramesh Doddaiah, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/931,867

(22) Filed: May 14, 2020

(51) Int. Cl.
*G06F 13/00* (2006.01)
*G06F 3/06* (2006.01)
*G06F 9/4401* (2018.01)

(52) U.S. Cl.
CPC .......... *G06F 3/0635* (2013.01); *G06F 3/061* (2013.01); *G06F 3/067* (2013.01); *G06F 3/0644* (2013.01); *G06F 3/0653* (2013.01); *G06F 3/0659* (2013.01); *G06F 9/4411* (2013.01)

(58) Field of Classification Search
CPC .... G06F 3/0635; G06F 9/4411; G06F 3/0644; G06F 3/061; G06F 3/067; G06F 3/0659; G06F 3/0653
See application file for complete search history.

(56) References Cited

U.S. PATENT DOCUMENTS

| | | | |
|---|---|---|---|
| 6,434,637 B1 * | 8/2002 | D'Errico | G06F 3/0647 710/15 |
| 6,567,397 B1 | 5/2003 | Campana et al. | |
| 6,687,746 B1 | 2/2004 | Shuster et al. | |

(Continued)

FOREIGN PATENT DOCUMENTS

| | | |
|---|---|---|
| CN | 103677927 B | 2/2017 |
| CN | 111767134 A * | 10/2020 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Jing-Yih Shyu
(74) *Attorney, Agent, or Firm* — Ryan, Mason & Lewis, LLP (57) ABSTRACT

An apparatus comprises at least one processing device comprising a processor coupled to a memory. The at least one processing device is configured to receive, via a multi-path layer of at least one host device, at least one indication of a predicted distribution of input-output operations directed from the at least one host device to a storage system for a given time interval. The at least one processing device is also configured to determine a cache memory configuration for a cache memory associated with the storage system based at least in part on the at least one indication of the predicted distribution of input-output operations for the given time interval. The at least one processing device is further configured to provision the cache memory with the determined cache memory configuration for the given time interval.

20 Claims, 4 Drawing Sheets

(56) References Cited

U.S. PATENT DOCUMENTS

| | | |
|---|---|---|
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2004/0177244 A1* | 9/2004 | Murphy ............... G06F 9/5077 713/100 |
| 2006/0026346 A1* | 2/2006 | Kadoiri ............... G06F 3/061 711/114 |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0225094 A1* | 8/2013 | Mujtaba ............ H04W 52/0209 455/73 |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0242054 A1* | 8/2016 | Lee ..................... H04B 17/345 |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |

FOREIGN PATENT DOCUMENTS

| | | | |
|---|---|---|---|
| EP | 1117028 A2 | 7/2001 | |
| EP | 2667569 A1 | 11/2013 | |
| WO | WO-0039679 A2 * | 7/2000 | ............ G06F 9/5011 |
| WO | PCT/US2019/052549 | 12/2019 | |
| WO | PCT/US2019/053204 | 12/2019 | |
| WO | PCT/US2019/053473 | 12/2019 | |
| WO | PCT/US2019/067144 | 5/2020 | |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit Pundalik Anchi et al. filed Dec. 11, 2019, and entitled "Automated Seamless Migration with Signature Issue Resolution."

* cited by examiner

STORAGE ARRAY WITH DYNAMIC CACHE MEMORY CONFIGURATION PROVISIONING BASED ON PREDICTION OF INPUT-OUTPUT OPERATIONS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated TO patterns. Such host devices also generate additional IO operations in performing various data services such as migration and replication. Storage systems may implement cache memory for facilitating TO operations processing. The configuration of the cache memory, such as cache allocations for different memory segments and pools within the memory segments, can impact overall storage system performance particularly when the cache memory configuration is not optimized for the number and type of IO operations received.

SUMMARY

Illustrative embodiments provide techniques for dynamically provisioning a configuration of a cache memory associated with a storage system based at least in part on predicted distributions of input-output operations, which advantageously avoid the drawbacks of the conventional techniques described above.

In some embodiments, at least a portion of the cache memory configuration provisioning functionality is implemented in at least one host driver of a host device that directs input-output (IO) operations to a storage system, such as a multi-path input-output (MPIO) driver of the host device. Other types of host drivers can be used in place of or in addition to one or more MPIO drivers. For example, in some embodiments, at least a portion of the disclosed cache memory configuration provisioning functionality is carried out using one or more non-MPIO host drivers.

As indicated above, conventional approaches to provisioning cache memory configuration are problematic, in that conventional approaches do not permit dynamic balancing of the cache memory configuration based on predicted IO distribution for the storage system. Illustrative embodiments disclosed herein provide techniques that enable such dynamic balancing of the cache memory configuration that avoid the drawbacks of conventional approaches.

In one embodiment, an apparatus comprises at least one processing device comprising a processor coupled to a memory. The at least one processing device is configured to receive, via a multi-path layer of at least one host device, at least one indication of a predicted distribution of IO operations directed from the at least one host device to a storage system for a given time interval. The at least one processing device is also configured to determine a cache memory configuration for a cache memory associated with the storage system based at least in part on the at least one indication of the predicted distribution of IO operations for the given time interval. The at least one processing device is further configured to provision the cache memory with the determined cache memory configuration for the given time interval.

The at least one processing device, in some embodiments, is part of the storage system, such as part of one or more storage controllers of the storage system that implement the cache memory.

In some embodiments, the multi-path layer comprises at least one MPIO driver configured to control delivery of IO operations from the at least one host device to particular ports of the storage system over selected ones of a plurality of paths through a network. The paths may be associated with respective initiator-target pairs with each of a plurality of initiators of the initiator-target pairs comprising a corresponding host bus adaptor of the at least one host device and each of a plurality of targets of the initiator-target pairs comprising a corresponding one of the ports of the storage system.

The predicted distribution of IO operations for the given time interval may be determined based at least in part on a state of one or more IO queues of the at least one host device, the state being determined utilizing the at least one MPIO driver. The indication of the predicted distribution of IO operations for the given time interval may comprise percentages of different types of IO commands in the one or more IO queues of the at least one host device. The indication of the predicted distribution of IO operations for the given time interval may also or alternatively comprise at least one of an average IO size and a peak IO size determined by performing a time series analysis of historical IO distributions and the current state of the one or more IO queues of the at least one host device.

In some embodiments, the at least one indication of the prediction distribution of IO operations comprises at least one hint delivered via a vendor unique command associated with the at least one MPIO driver.

Receiving the at least one indication of the predicted distribution of IO operations for the given time interval may comprise receiving the at least one indication during the given time interval from the at least one MPIO driver responsive to identifying a burst of IO activity directed from the at least one host device to the storage system.

The multi-path layer, in some embodiments, comprises two or more host devices each associated with at least one MPIO driver configured to control delivery of IO operations from that host device to particular ports of the storage system over selected ones of the plurality of paths through the network. Receiving the at least one indication of the predicted distribution of IO operations for the given time interval may comprise receiving two or more indications of the predicted distribution of IO operations for the given time interval from the MPIO drivers of the two or more host devices. Determining the cache memory configuration for the cache memory may comprise combining the two or more indications of the predicted distribution of IO operations for the given time interval received from the MPIO drivers of the two or more host devices.

In some embodiments, the cache memory comprises two or more memory segments, and the determined cache memory configuration comprises a segment size for each of the two or more memory segments. A given one of the two or more memory segments may comprise two or more pools associated with two or more IO operation types, and the determined cache memory configuration comprises a fixed cache size for each of the two or more pools. The determined cache memory configuration may comprise, for the given memory segment, a first fixed cache size for a first one of the two or more pools for a first one of the two or more IO operation types and a second fixed cache size different than the first fixed cache size for a second one of the two or more pools for a second one of the two or more IO operation types.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
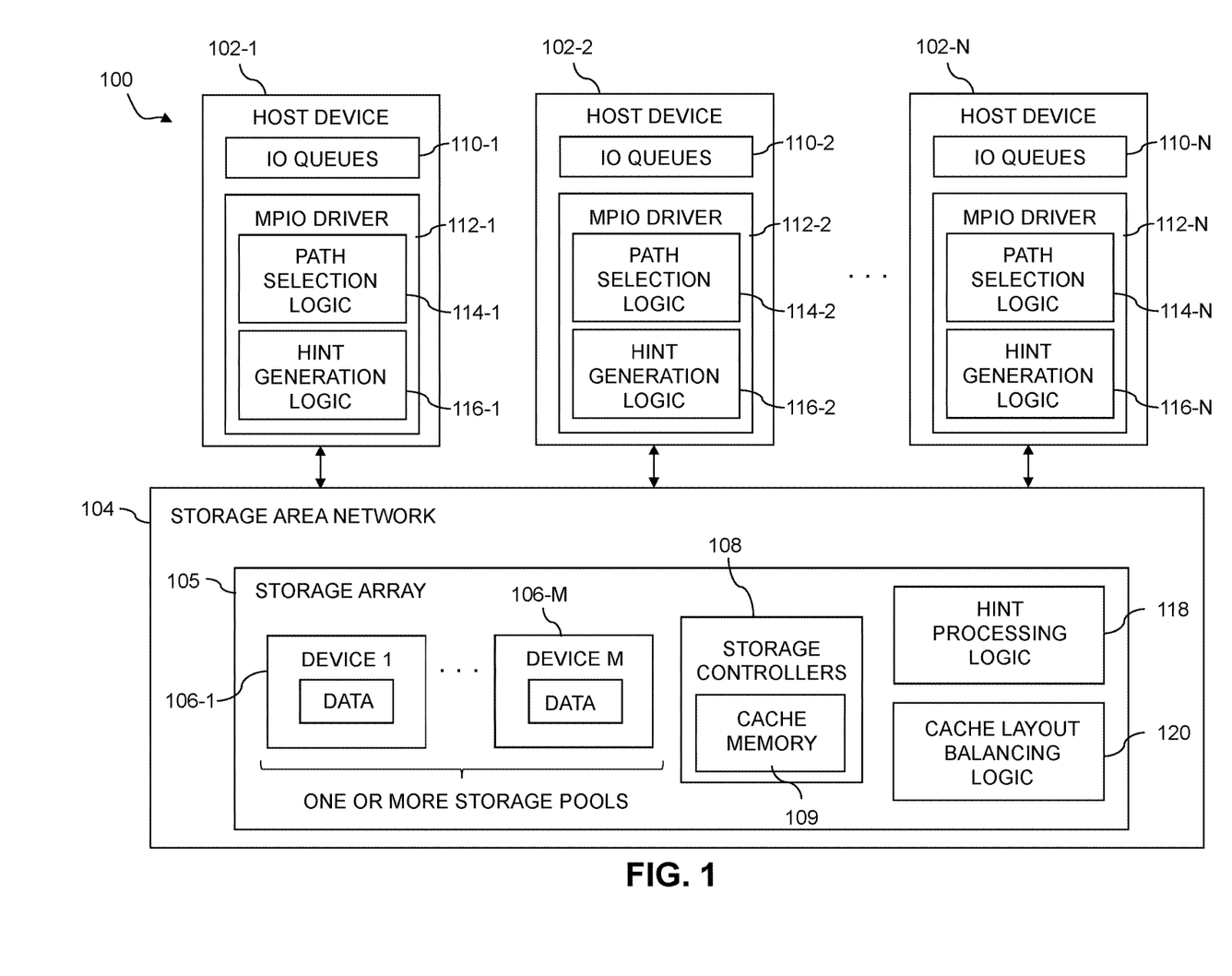
FIG. 1 is a block diagram of an information processing system configured with functionality for dynamically provisioning a configuration of a cache memory of a storage system in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for dynamically provisioning a configuration of a cache memory 109 implemented on one or more storage controllers 108 of the storage array 105. Such functionality is provided at least in part using respective instances of path selection logic 114-1, 114-2, . . . 114-N and hint generation logic 116-1, 116-2, . . . 116-N implemented within the MPIO drivers 112, and by hint processing logic 118 and cache layout balancing logic 120 implemented by the storage array 105.

The MPIO drivers 112 may comprise, for example, otherwise conventional MPIO drivers, such as PowerPath® drivers from Dell EMC, suitably modified in the manner disclosed herein to provide functionality for dynamic provisioning of cache memory configuration of the cache memory 109 of storage array 105. Other types of MPIO drivers from other driver vendors may be suitably modified to incorporate functionality for dynamic provisioning of cache memory configuration as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection" and may be controlled using the path selection logic 114-1 of MPIO driver 112-1. Path selection as that term is broadly used herein can in some cases involve both selection of a particular 10 operation and selection of one of multiple possible paths for accessing a corresponding logical device of the storage array 105. The corresponding logical device illustratively comprises a LUN or other logical storage volume to which the particular 10 operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to obtain from the storage array 105 connectivity information characterizing one or more ports of the storage array 105, and to automatically establish connectivity of a particular type between the host device 102-1 and one or more logical storage devices of the storage array 105 based at least in part on the obtained connectivity information. The operations of obtaining connectivity information and automatically establishing connectivity of a particular type in some embodiments are more particularly performed by the user-space component of the MPIO driver 112-1, although other arrangements are possible.

Host multi-pathing software implementing a multi-path layer comprising MPIO drivers 112 of respective host devices 102 can be configured to operate in conjunction with management appliance software, such as PowerPath® Management Appliance (PPMA), to identify host connectivity to a given storage array, and to facilitate automated connectivity provisioning for one or more of the host devices 102.

In the FIG. 1 embodiment, the storage array 105 comprises a plurality of storage controllers 108 implementing cache memory 109. The cache memory 109 is utilized in processing 10 operations. In some embodiments, each of the storage controllers 108 has a different local cache or a different allocated portion of a global cache of the cache memory 109 associated therewith, although numerous alternative arrangements are possible. The storage controllers 108 can be implemented as respective storage processors, directors or other storage system components configured to control storage system operations relating to processing of IO operations. Although shown as internal to the storage controllers 108 in the FIG. 1 embodiment, in other embodiments the cache memory 109 may be implemented at least in part external to the storage controllers 108.

Figure 4:
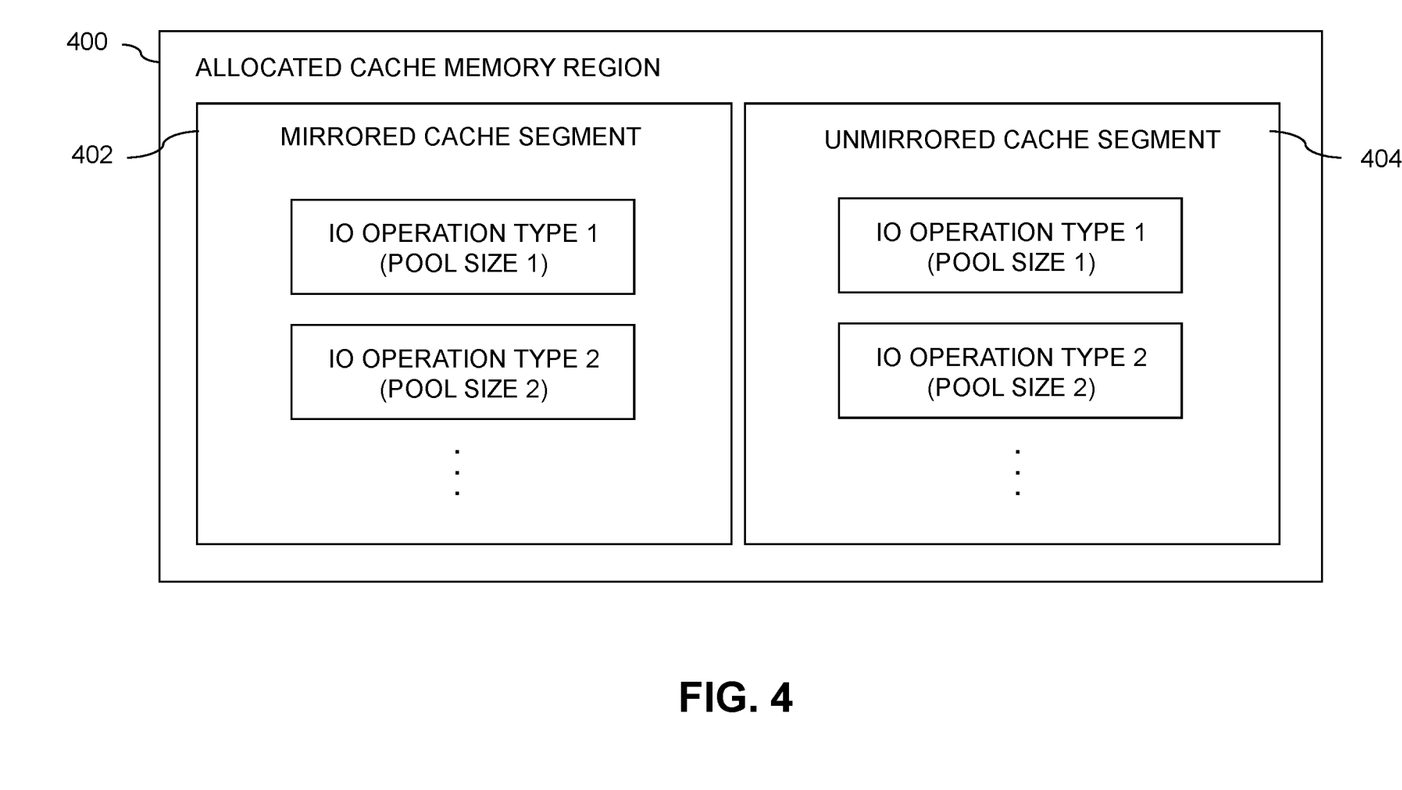
FIG. 4 shows an example of a cache memory configuration for a cache memory of a storage system in an illustrative embodiment.

The cache memory 109 may include or utilize various different layout structures, including different mirrored and unmirrored regions or segments. In some embodiments, the mirrored segments are used as a write cache and the unmirrored segments are used as a read cache. Such cache regions may be segmented or broken down into different cache pool sizes based on the IO sizes that will be cached therein. A pool within a segment is a bundle or collection of cache slots each having the same cache slot size. For example, a mirrored region or segment of the cache memory 109 may have a first pool with a first cache slot size for a first type of IO operations, a second pool with a second cache slot size for a second type of IO operations, etc. FIG. 4, described in further detail below, illustrates different pools within mirrored and unmirrored segments of an allocated cache memory region.

In conventional approaches, storage arrays may use a fixed cache size (e.g., 128 kilobytes (KB), which may be track aligned). Any IO operation, regardless of its size, will consume only a portion of the fixed cache size (e.g., an allocated 128 KB chunk, if not 128 KB or higher already). Further, in conventional approaches the mirrored and unmirrored portions or segments of the cache memory are fixed in size. Cumbersome manual procedures are required to change the size of the mirrored and unmirrored portions or segments of the cache memory. Further, without a proper understanding of what types of IO operations are running, it is difficult for a storage administrator or other user to configure the right schema or layout in the cache memory. Without a properly configured cache memory layout, the storage array may not provide a level of service that the customer or other user thereof expects.

If relatively large cache data segments are used (e.g., 128 KB), but there are many IO operations of a smaller size (e.g., 8 KB), there may be significant waste (e.g., 90% unused space within the 128 KB cache slot size). While the use of a relatively large cache data segment size provides convenience for managing metadata, it can represent significant waste of resources (e.g., including expensive random-access memory (RAM) used in implementing cache memory 109).

As noted above, the cache data segments (e.g., mirrored and unmirrored portions or segments of an allocated cache memory region), are of fixed size and require manual procedures to change them. Such manual procedures are problematic, in that a storage administrator may not get the exact layout configured to meet customer expectations and, in some cases, may not even know what the segmented regions should be changed to. These issues are exacerbated in that creating different pool sizes and different memory segments are resource-intensive tasks (e.g., such procedures may consume significant CPU and storage fabric resources). The storage administrator may have no way of knowing what the incoming workload (e.g., from host devices 102) will be in a given time window in order to properly dynamically rebalance memory segments and pool sizes within the memory segments. During host IO bursts, some of the mirrored and unmirrored segments might overflow, and pool sizes might also overflow, which can cause frequent segment and pool rebalancing. This can significantly impact overall system performance, as cache allocations are a core operation of storage arrays for both internal and external workloads.

Illustrative embodiments overcome these and other drawbacks of conventional approaches by leveraging the use of MPIO drivers 112 in host devices 102, which have knowledge of incoming workload for the storage array 105 in the form of different IO sizes and number of IO operations in a given time window (e.g., from associated IO queues 110). During host backup operations and IO burst activities for a particular host device 102-1, most of the IO operations (e.g., from Oracle databases and other applications) are first queued in the associated IO queues 110-1. The MPIO driver 112-1 may need to split larger IO operations into multiple commands, and utilizes path selection logic 114-1 to find optimal paths for such commands to the storage array 105 (e.g., across storage engines and boards).

When the MPIO driver 112-1 splits larger IO operations and adds them to internal deep queues, the hint generation logic 116-1 can determine the types of the commands (e.g., read or write). The hint generation logic 116-1 may further perform time series analysis of past IO distribution, and predict IO distribution for a next time interval to generate "hints" used by the storage controllers 108 of storage array 105 for determining how to configure the layout of the cache memory 109. Each IO stored in the IO queues 110 of the host may be associated with a process identifier (ID), and the time series analysis may be performed on a per-process ID basis. The predicted IO distribution, in some embodiments, includes average and peak IO sizes of such commands (e.g., 4 KB, 8 KB, 16 KB, 64 KB, 128 KB, etc.). The hint generation logic 116-1 of the MPIO driver 112-1 converts this knowledge into some percentages for a given time window (e.g., the next 300 seconds, the next 600 seconds, etc.) and sends such details as the generated hints to the storage array 105. The hints may be sent to the storage array 105 using a "vendor unique command" or VU command, a mode sense or mode select command, via using vendor unique bits inside standard CDBs, etc. When certain IO spikes occur, the MPIO driver 112-1 can revalidate the hints already sent to the storage array 105 and override them with real-time hint updates if necessary.

The storage array 105, as shown in FIG. 1, implements hint processing logic 118 and cache layout balancing logic 120. The hint processing logic 118 and the cache layout balancing logic 120 may be implemented by a processor of the storage array 105. Although shown as external to the storage controllers 108 in the FIG. 1 embodiment, one or both of the hint processing logic 118 and the cache layout balancing logic 120 may be implemented at least in part internal to one or more of the storage controllers 108.

The hint processing logic 118 is configured to receive and process the hints from the MPIO driver 112-1 that are produced by the hint generation logic 116-1. In some embodiments, the hints may comprise only a few bits for indicating what percentages of read and write jobs will be incoming in the next time window, as well as what percentages of different 10 sizes to expect in the next time window. In other embodiments, however, the hints may include further detail regarding the predicted 10 distribution for the next time window. The hint processing logic 118 may check for new hints from the MPIO drivers 112 (e.g., at every time window level), and decides whether to act on the information contained in the hints based at least in part on some internal thresholds and existing workload pressure. As noted above, the storage array 105 may represent a storage system shared among the host devices 102, and thus the storage array 105 may receive hints from hint generation modules 116 on two or more of the MPIO drivers 112 of two or more of the host devices 102. The hints from different ones of the host devices 102 may be combined to generate an overall view of predicted 10 distribution for the next time window across the host devices 102 collectively.

Using information contained in the hints (e.g., the predicted 10 distribution for the next time window), the cache layout balancing logic 120 can determine whether any changes in the layout of the cache memory 109 are to be made. As noted above, this may be done in accordance with various policies, including the use of designated thresholds (e.g., for determining that a proposed rebalancing will provide some threshold level of benefit that outweighs consumption of CPU and storage fabric resources necessary for implementing the proposed rebalancing, etc.). If changes are to be made, the cache layout balancing logic 120 can execute such changes in the layout of the cache memory 109 to rebalance the layout for the predicted IO distribution in the next time window. Changing the layout of the cache memory 109 may include, for example, rebalancing memory segments and pool sizes within these segments automatically ahead of time before IO burst activity hits the storage array 105. As a result, host response time impact will be reduced. Host IOPS will also improve as more CPU cycles from the cache subsystem of the storage controllers 108 can be used for servicing IOs instead of doing memory and pool rebalancing. Further, race conditions during burst IO activity may be avoided. Overall system performance is also improved, as cache layout rebalancing is performed ahead of time, rather than during IO processing (e.g., during IO burst activity).

An example of a process including such operations for dynamically provisioning a configuration of the cache memory 109 will be described below in conjunction with the flow diagram of FIG. 2. These and other operations referred to herein as being performed by an MPIO driver or storage controller can in other embodiments be performed at least in part by other host device or storage array components.

The multi-pathing software portions of example techniques described above may be performed by a given MPIO driver on a corresponding host device, and similarly by other MPIO drivers on respective other host devices. Such MPIO drivers illustratively form a multi-path layer comprising multi-pathing software of the host devices. Other types of host drivers can be used in other embodiments. For example, in some embodiments, at least a portion of the disclosed dynamic cache memory configuration provisioning functionality is carried out using one or more iSCSI drivers, or other types of non-MPIO host drivers.

These and other functions related to dynamically provisioning a configuration of the cache memory 109 that are referred to herein as being performed by or under the control of the MPIO driver 112-1 can in some embodiments be performed at least in part outside of the MPIO driver 112-1, such as in the host device 102-1 generally.

The above-described functions associated with dynamically provisioning a configuration of the cache memory 109 in the MPIO driver 112-1 in some embodiments are carried out at least in part under the control of its path selection logic 114-1 and hint generation logic 116-1. For example, the path selection logic 114-1 and hint generation logic 116-1 are illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for dynamically provisioning a configuration of the cache memory 109.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support dynamical provisioning a configuration of the cache memory 109.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory (e.g., cache memory 109) that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAIVI) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, storage controllers 108, sets of IO queues 110, MPIO drivers 112, instances of path selection logic 114, hint generation logic 116, hint processing logic 118 and cache layout balancing logic 120, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices, and implements a cache memory for facilitating IO operations received from the at least one host device. The storage devices can include logical storage devices such as LUNs or other logical storage volumes.

Figure 2:
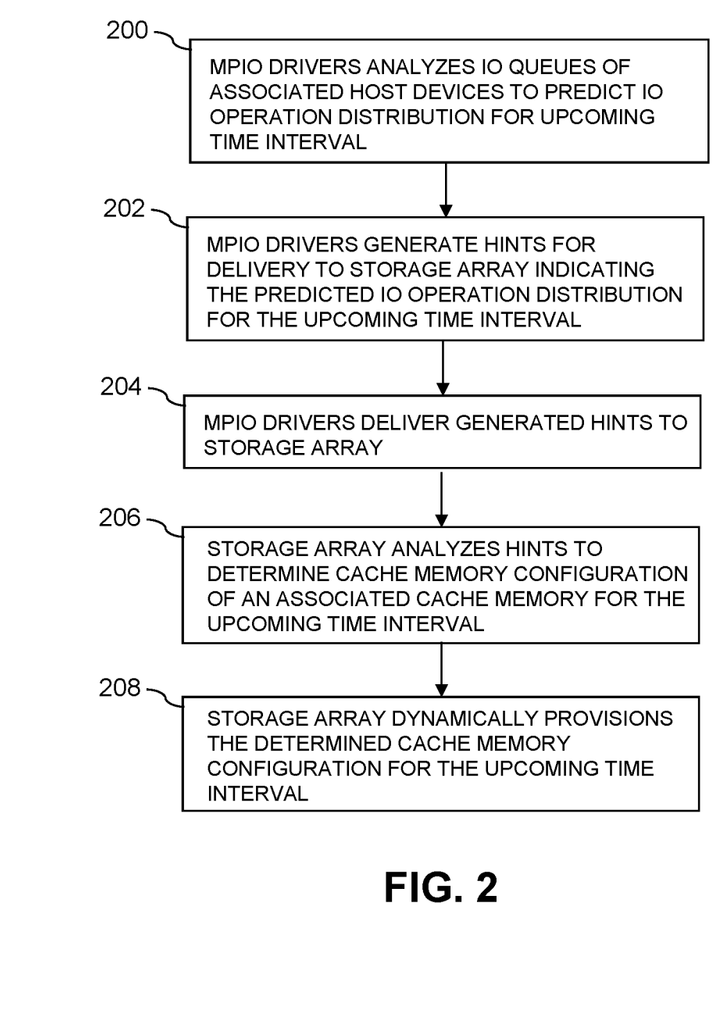
FIG. 2 is a flow diagram of a process for dynamically provisioning a configuration of a cache memory of a storage system in an illustrative embodiment.

The steps of the FIG. 2 process are illustratively performed at least in part by or under the control of an MPIO driver of a given host device. For example, portions of the process may be carried out under the control of software, firmware and/or hardware of an instance of hint generation logic deployed within the MPIO driver. Accordingly, at least a portion of the FIG. 2 process may be viewed as an example of an algorithm performed by the hint generation logic 116-1 of the MPIO driver 112-1 of host device 102-1. Additionally or alternatively, the MPIO driver 112-1 may comprise a user-space component and a kernel-space component, with the FIG. 2 process being performed primarily by the user-space component of the MPIO driver 112-1. Other arrangements of host device components and/or other system components can be configured to perform at least portions of one or more of the steps in other embodiments. Portions of the FIG. 2 process may also be performed at least in part by or within the storage system, such as on one or more storage controllers or other storage processors configured to provision an associated cache memory.

In step 200, MPIO drivers 112 analyze queues 110 of associated host devices 102 so as to predict IO operation distribution for an upcoming time interval. The size of the upcoming time interval may vary. In some embodiments, each time interval or time window is in the range of seconds depending on how quickly the storage array 105 is able to react and reconfigure or rebalance the memory segments and pools of the cache memory 109. In some embodiments, the upcoming time interval is one minute or greater, although other time interval sizes may be used as desired. The MPIO drivers 112 illustratively provide a multi-path layer, where the MPIO drivers 112 are configured to control delivery of IO operations from the host devices 102 to particular ports of the storage array 105 over selected ones of a plurality of paths through SAN 104.

The predicted distribution of IO operations for the upcoming time interval may be based at least in part on a state of the IO queues 110 of the host devices 102, where the state of the IO queues 110 is determined utilizing the MPIO drivers 112. The predicted distribution of IO operations for the upcoming time interval may include: percentages of different types of IO commands in the IO queues 110 of the host devices 102; an average IO size determined by performing time series analysis of historical IO distributions as well as the current state of the IO queues 110 of the host devices 102; a peak IO size determined by performing the time series analysis of historical IO distributions and the current state of the IO queues 110 of the host devices 102; combinations thereof; etc.

In step 202, the MPIO drivers 112 generate hints (also referred to herein as indications) for delivery to the storage array 105. The generated hints comprise information regarding the predicted IO operation distribution for the upcoming time interval.

In step 204, the MPIO drivers 112 deliver the generated hints to the storage array 105, such as to one or more storage controllers 108 or other types of storage processors thereof. Step 204, in some embodiments, includes delivering the generated hints via VU commands that are associated with the MPIO drivers 112. It should be noted that while steps 200 through 204 are described with respect to generating and delivering hints for an upcoming time interval, in other embodiments one or more hints may be generated and delivered in "real time" (e.g., during a particular time interval) responsive to determining IO bursts or spikes that may necessitate dynamic rebalancing of the cache memory 109 configuration.

In step 206, the storage array 105 analyzes the hints delivered in step 204 to determine a configuration for the cache memory 109 for the upcoming time interval. It should be noted that although steps 200 through 206 refer to multiple MPIO drivers associated with multiple host devices generating and delivering hints to the storage array 105, this is not a requirement. For example, where the host device 102-1 has exclusive use of the storage array 105, then only one hint may be generated and delivered by its associated MPIO driver 112-1. As another example, only a subset of the host devices 102 and associated MPIO drivers 112 may generate and deliver hints to the storage array 105 rather than all of the host devices 102. In embodiments where multiple hints are generated and delivered, step 206 may include combining the multiple hints or indications to determine the configuration for the cache memory 109 in the upcoming time interval.

In step 208, the storage array 105 dynamically provisions the cache memory 109 with the configuration determined in step 206 for the upcoming time interval. Such provisioning may include balancing or rebalancing memory segment and pool sizes of the cache memory 109. The cache memory 109 may include two or more memory segments (e.g., a mirrored cache segment and an unmirrored cache segment), with the determined cache memory configuration comprising segment sizes for each of the two or more memory segments. A given one of the two or more memory segments may comprise two or more pools associated with two or more IO operation types. The determined cache memory configuration may comprise a fixed cache size for each of the two or more pools (e.g., which may include different fixed cache sizes for different ones of the pools for different IO operation types).

The process then returns to step 200 in order to perform one or more additional instances of the process with each such additional instance being performed for a new upcoming time interval.

Multiple additional instances of the FIG. 2 process may be performed in respective additional host devices that share the storage array. Other embodiments can include multiple storage arrays, with the disclosed functionality for dynamically provisioning a configuration of a cache memory for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for dynamically provisioning a configuration of a cache memory of a storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different dynamic cache memory configuration provisioning arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
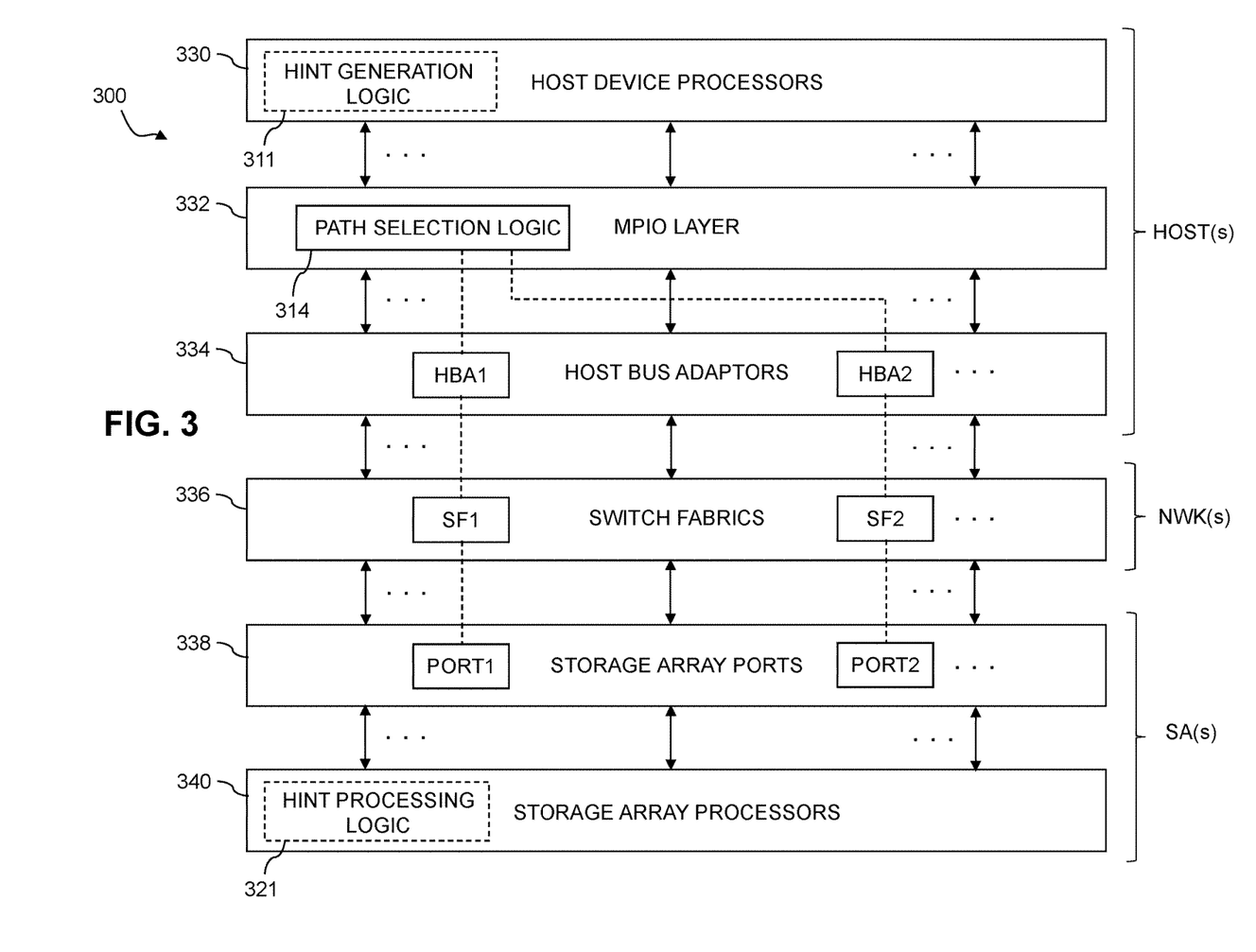
FIG. 3 is a block diagram showing multiple layers of a layered system architecture that includes a multi-path layer with functionality for dynamically provisioning a configuration of a cache memory of a storage system in an illustrative embodiment.

Referring now to FIG. 3, another illustrative embodiment is shown. In this embodiment, an information processing system 300 comprises host-side hint generation logic 311, path selection logic 314 and storage-side hint processing logic 321. There may be separate instances of one or more such elements associated with each of a plurality of system components such as host devices and storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements dynamic provisioning of a configuration of cache memory associated with one or more storage arrays utilizing one or more MPIO drivers of the MPIO layer 332, and associated instances of host-side hint generation logic 311 and storage-side hint processing logic 321. The host-side hint generation logic 311 is illustratively shown as part of one or more host device processors of the host device processor layer 330. Similarly, the storage-side hint processing logic 321 is illustratively shown as part of one or more storage array processors of the storage array processor layer 340. A wide variety of other distributed logic arrangements are possible, and the host-side hint generation logic 311 and storage-side hint processing logic 321 are therefore shown in dashed outline in the figure. For example, the hint generation logic 311 may be implemented within the MPIO layer 332 rather than the host processor layer 330, the hint generation logic 311 may be implemented at least in part within the host processor layer 330 and at least in part within the MPIO layer 332, etc. The host-side hint generation logic 311 and storage-side hint processing logic 321 illustratively operate in conjunction with one or more MPIO drivers of the MPIO layer 332 to facilitate dynamic cache memory configuration provisioning in the manner disclosed herein.

The MPIO layer 332 is an example of what is also referred to herein as a multi-path layer, and comprises one or more MPIO drivers implemented in respective host devices. Each such MPIO driver illustratively comprises an instance of path selection logic 314 configured to provide functionality similar to that of path selection logic 114 described above with respect to MPIO drivers 112. The host-side hint generation logic 311 is configured to provide functionality similar to that of hint generation logic 116 described above with respect to MPIO drivers 112, and the storage-side provisioning logic 321 is configured to provide functionality similar to that of hint processing logic 118 and cache layout balancing logic 120 described above with respect to storage array 105. Additional or alternative layers and logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

It is assumed in this embodiment that the host devices through their respective MPIO drivers and respective instances of path selection logic 314 provide functionality for automated connectivity provisioning. Accordingly, the path selection logic 314 in some embodiments automatically establishes connectivity to one or more logical storage devices of one or more storage arrays, and determines appropriate paths over which to send particular IO operations to those logical storage devices of the one or more storage arrays.

The host-side hint generation logic 311 and the storage-side hint processing logic 321 are configured to provide functionality for dynamically provisioning configuration of cache memory associated with storage arrays as described elsewhere herein.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Referring now to FIG. 4, an example of an allocated cache memory region 400 (e.g., of cache memory, such as cache memory 109 in FIG. 1) that is maintained by a storage array is shown. In the FIG. 4 example, the allocated cache memory region 400 includes a mirrored cache segment 402 and an unmirrored cache segment 404. Each of the mirrored cache segment 402 and the unmirrored cache segment 404 further includes different allocated pool sizes for different types of IO operations (e.g., IO operation type 1 with pool size 1, IO operation type 2 with pool size 2, etc.). Consider, as an example, a 1 terabyte (TB) allocated cache memory region 400 that includes 600 gigabytes (GB) of mirrored cache and 400 GB of unmirrored cache. The mirrored cache may be broken down into different cache pool sizes, such as a 128 kilobyte (KB) pool size for large multi-track writes, a 16 KB pool size for online transaction processing (OLTP) transactions, a 4 KB pool size for handling Oracle database redo jobs, etc. The sizes of the mirrored cache segment 400 and the unmirrored cache segment 402, as well as the pool sizes therein for different IO operation types, may be dynamically rebalanced as described elsewhere herein based on hint of predicted IO distribution for respective time intervals that are communicated by or using a multi-path layer of one or more host devices coupled to a storage system.

The above-described processes, algorithms and other features and functionality disclosed herein are presented by way of illustrative example only, and other embodiments can utilize additional or alternative arrangements.

Also, as mentioned previously, different instances of the above-described processes, algorithms and other dynamic cache memory configuration provisioning techniques can be performed by different MPIO drivers in different host devices, or using other types of host drivers, such as, for example, iSCSI drivers.

The particular dynamic cache memory configuration provisioning arrangements described above are therefore presented by way of illustrative example only. Numerous alternative arrangements of these and other features can be used in implementing dynamic cache memory configuration provisioning in other illustrative embodiments.

The illustrative embodiments disclosed herein can provide a number of significant advantages relative to conventional approaches for managing cache memory in a storage system. Drawbacks of such conventional approaches for managing cache memory in a storage system include the use of static sizing of mirrored and unmirrored segments, as well as the use of static sizing of pool sizes (e.g., 8 KB, 16 KB, 64 KB, 128 KB, etc.) within each segment. Conventional approaches for managing cache memory in a storage system, as detailed above, can also lead to subpar memory utilization (global memory and local store and forward) due to inefficient pool sizes and cache segment sizes. Conventional approaches for managing cache memory in a storage system may also lead to various race conditions during peak workload, which consume important storage system resources including processing, memory and network resources in the IO flow causing response time issues.

Illustrative embodiments for dynamic cache memory configuration provisioning provide improved memory utilization which reduces system write pending issues in storage arrays and therefore allows hosts to push more workload without performance impacts. Indirectly, this helps to increase system write pending thresholds. The improved memory utilization also helps important or high priority applications push more IO operations to the storage arrays without sharing storage bottlenecks with other low priority applications. In addition, illustrative embodiments enable dynamically changing pool sizes and cache segment sizes which reduces the cost of cache slot allocation for each IO operation during peak performance. These embodiments further improve response time for every IO operation that needs a new cache slot. Advantageously, the various performance improvements described herein are particularly appreciable during peak workloads of storage arrays. Illustrative embodiments can also advantageously prevent significant degradations in IO processing performance that might otherwise occur if conventional cache memory management approaches are used.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114, the hint generation logic 116, the hint processing logic 118 and the cache layout balancing logic 120 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, hint generation logic and processing, and additional or alternative components. Also, the particular configurations of system and device elements and associated processing operations illustratively shown in the drawings can be varied in other embodiments. For example, a wide variety of different host device and storage system configurations can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
where the at least one processing device is configured:
to receive, via a multi-path layer of at least one host device, at least one indication of a predicted distribution of input-output operations directed from the at least one host device to a storage system for a given time interval;
to determine a cache memory configuration for a cache memory associated with the storage system based at least in part on the at least one indication of the predicted distribution of input-output operations for the given time interval; and
to provision the cache memory with the determined cache memory configuration for the given time interval.

2. The apparatus of claim 1 wherein the multi-path layer comprises at least one multi-path input-output driver configured to control delivery of input-output operations from the at least one host device to particular ports of the storage system over one or more selected ones of a plurality of paths through a network.

3. The apparatus of claim 2 wherein the paths are associated with respective initiator-target pairs with each of a plurality of initiators of the initiator-target pairs comprising a corresponding host bus adaptor of the at least one host device and each of a plurality of targets of the initiator-target pairs comprising a corresponding one of the ports of the storage system.

4. The apparatus of claim 2 wherein the predicted distribution of input-output operations for the given time interval is determined based at least in part on a state of one or more input-output queues of the at least one host device, the state being determined utilizing the at least one multi-path input-output driver.

5. The apparatus of claim 4 wherein the indication of the predicted distribution of input-output operations for the given time interval comprises percentages of different types of input-output commands in the one or more input-output queues of the at least one host device.

6. The apparatus of claim 4 wherein the indication of the predicted distribution of input-output operations for the given time interval comprises at least one of an average input-output size and a peak input-output size determined by performing a time series analysis of historical input-output distributions and the current state of the one or more input-output queues of the at least one host device.

7. The apparatus of claim 2 the at least one indication of the prediction distribution of input-output operations comprises at least one hint delivered via a vendor unique command associated with the at least one multi-path input-output driver.

8. The apparatus of claim 2 wherein receiving the at least one indication of the predicted distribution of input-output operations for the given time interval comprises receiving the at least one indication during the given time interval from the at least one multi-path input-output driver responsive to identifying a burst of input-output activity directed from the at least one host device to the storage system.

9. The apparatus of claim 2 wherein the multi-path layer comprises two or more host devices each associated with at least one multi-path input-output driver configured to control delivery of input-output operations from that host device to particular ports of the storage system over the one or more selected ones of the plurality of paths through the network.

10. The apparatus of claim 9 wherein receiving the at least one indication of the predicted distribution of input-output operations for the given time interval comprises receiving two or more indications of the predicted distribution of input-output operations for the given time interval from the multi-path input-output drivers of the two or more host devices.

11. The apparatus of claim 10 wherein determining the cache memory configuration for the cache memory comprises combining the two or more indications of the predicted distribution of input-output operations for the given time interval received from the multi-path input-output drivers of the two or more host devices.

12. The apparatus of claim 1 wherein the cache memory comprises two or more memory segments, and wherein the determined cache memory configuration comprises a segment size for each of the two or more memory segments.

13. The apparatus of claim 12 wherein a given one of the two or more memory segments comprises two or more pools associated with two or more input-output operation types, and wherein the determined cache memory configuration comprises a fixed cache size for each of the two or more pools.

14. The apparatus of claim 13 wherein the determined cache memory configuration comprises, for the given memory segment, a first fixed cache size for a first one of the two or more pools for a first one of the two or more input-output operation types and a second fixed cache size different than the first fixed cache size for a second one of the two or more pools for a second one of the two or more input-output operation types.

15. A method comprising:
receiving, via a multi-path layer of at least one host device, at least one indication of a predicted distribution of input-output operations directed from the at least one host device to a storage system for a given time interval;
determining a cache memory configuration for a cache memory associated with the storage system based at least in part on the at least one indication of the predicted distribution of input-output operations for the given time interval; and
provisioning the cache memory with the determined cache memory configuration for the given time interval;
wherein the method is performed by at least one processing device comprising a processor coupled to a memory.

16. The method of claim 15 wherein the cache memory comprises two or more memory segments, and wherein the determined cache memory configuration comprises a segment size for each of the two or more memory segments.

17. The method of claim 16 wherein a given one of the two or more memory segments comprises two or more pools associated with two or more input-output operation types, and wherein the determined cache memory configuration comprises a fixed cache size for each of the two or more pools.

18. A computer program product comprising a non-transitory processor-readable storage medium having stored therein program code of one or more software programs, wherein the program code, when executed by at least one processing device comprising a processor coupled to a memory, causes the at least one processing device:
to receive, via a multi-path layer of at least one host device, at least one indication of a predicted distribution of input-output operations directed from the at least one host device to a storage system for a given time interval;
to determine a cache memory configuration for a cache memory associated with the storage system based at least in part on the at least one indication of the predicted distribution of input-output operations for the given time interval; and
to provision the cache memory with the determined cache memory configuration for the given time interval.

19. The computer program product of claim 18 wherein the cache memory comprises two or more memory segments, and wherein the determined cache memory configuration comprises a segment size for each of the two or more memory segments.

20. The computer program product of claim 19 wherein a given one of the two or more memory segments comprises two or more pools associated with two or more input-output operation types, and wherein the determined cache memory configuration comprises a fixed cache size for each of the two or more pools.

\* \* \* \* \*